(12) United States Patent
Gainey et al.

(10) Patent No.: US 8,503,926 B2
(45) Date of Patent: Aug. 6, 2013

(54) IQ IMBALANCE COMPENSATION IN INTERFERENCE CANCELLATION REPEATER USING A ZERO-IF RADIO ARCHITECTURE

(75) Inventors: Kenneth M. Gainey, San Diego, CA (US); James Arthur Proctor, Jr., Melbourne Beach, FL (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 12/940,697

(22) Filed: Nov. 5, 2010

(65) Prior Publication Data

US 2012/0115412 A1    May 10, 2012

(51) Int. Cl.
*H04B 3/36* (2006.01)

(52) U.S. Cl.
USPC ............. 455/7; 455/11.1; 370/315; 370/316; 370/317

(58) Field of Classification Search
USPC ............. 455/7, 11.1, 12.1, 13.1, 16, 24, 427; 370/315, 316, 317, 226, 243, 274, 279, 293, 370/492, 501; 340/853.7, 291, 425.1
See application file for complete search history.

(56) References Cited

U.S. PATENT DOCUMENTS 7,890,078 B2 * 2/2011 Kluge et al. .................. 455/323
2003/0231723 A1   12/2003 Hansen
2005/0152482 A1 * 7/2005 Tubbax et al. ................ 375/346
2007/0263667 A1 * 11/2007 Dubuc et al. .................. 370/500
2010/0220825 A1 * 9/2010 Dubuc et al. .................. 375/346

FOREIGN PATENT DOCUMENTS

EP    1801963 A2    6/2007
EP    2053812 A2    4/2009

OTHER PUBLICATIONS

Anttila, Lauri et al., "Circularity-Based I/Q imbalance Compensation in Wideband Direct-Conversion Receivers," IEEE Transactions on Vehicular Technology, vol. 57, No. 4, Jul. 2008, pp. 2099-2113.
Eduardo Lopez-Estraviz et al: "EM Based Frequency-Dependent Transmit/Receive IQ Imbalance Estimation and Compensation in OFDM-Based Transceivers", Global Telecommunications Conference, 2007. Globecom '07. IEEE, IEEE, Piscataway, NJ, USA, Nov. 1, 2007, pp. 4274-4279, XP031196741, ISBN: 978-14244-1042-2, abstract paragraphs [001.], [VIII].
International Search Report and Written Opinion—PCT/US2011/059485—ISA/EPO—Jan. 27, 2012.

* cited by examiner

*Primary Examiner* — Nay A Maung
*Assistant Examiner* — Angelica Perez
(74) *Attorney, Agent, or Firm* — Thien T. Nguyen (57) ABSTRACT

An interference cancellation repeater employing zero-IF or direct conversion radio architecture implements IQ imbalance compensation using a metric and an adaptive algorithm. The metric is based on the image rejection ratio of the repeater and is indicative of the level of spectral image caused by the repeater's receiver or transmitter IQ imbalance.

22 Claims, 6 Drawing Sheets

IQ IMBALANCE COMPENSATION IN INTERFERENCE CANCELLATION REPEATER USING A ZERO-IF RADIO ARCHITECTURE

BACKGROUND

1. Field

This disclosure generally relates to repeaters in wireless communication systems.

2. Background

Wireless communication systems and techniques have become an important part of the way we communicate. However, providing coverage can be a significant challenge to wireless service providers. One way to extend coverage is to deploy repeaters.

Figure 1:
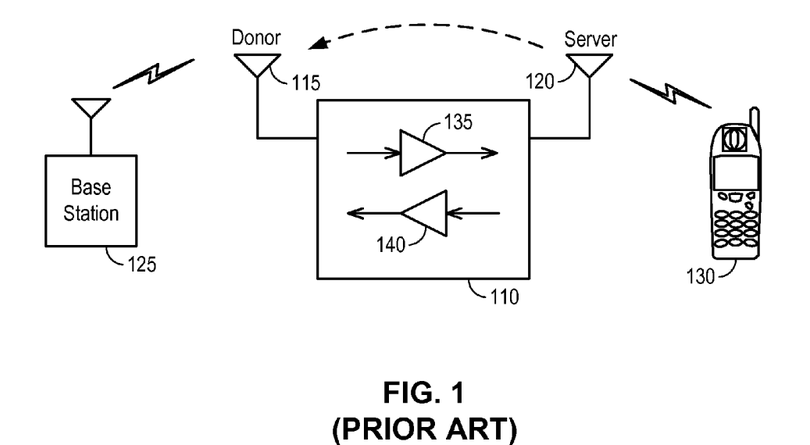
FIG. 1 is a simplified diagram of a repeater according to the prior art.

In general, a repeater is a device that receives a signal, amplifies the signal, and transmits the amplified signal. FIG. 1 shows a basic diagram of a repeater 110, in the context of a cellular telephone system. Repeater 110 includes a donor antenna 115 as an example network interface to network infrastructure such as a base station 125. Repeater 110 also includes a server antenna 120 (also referred to as a "coverage antenna") as a mobile interface to mobile device 130. In operation, donor antenna 115 is in communication with base station 125, while server antenna 120 is in communication with mobile devices 130.

In repeater 110, signals from base station 125 are amplified using forward link circuitry 135, while signals from mobile device 130 are amplified using reverse link circuitry 140. Many configurations may be used for forward link circuitry 135 and reverse link circuitry 140.

There are many types of repeaters. In some repeaters, both the network and mobile interfaces are wireless; while in others, a wired network interface is used. Some repeaters receive signals with a first carrier frequency and transmit amplified signals with a second different carrier frequency, while others receive and transmit signals using the same carrier frequency. For "same frequency" repeaters, one particular challenge is managing the feedback that occurs since some of the transmitted signal can leak back to the receive circuitry and be amplified and transmitted again.

Existing repeaters manage feedback using a number of techniques; for example, the repeater is configured to provide physical isolation between the two antennae, filters are used, or other techniques may be employed.

SUMMARY

Systems, apparatuses, and methods disclosed herein allow for enhanced repeater capability. According to one embodiment of the present invention, a method in an interference cancellation repeater implemented using a zero-IF receiver and a zero-IF transmitter includes receiving an input signal at a first antenna of the repeater where the input signal is a sum of a remote signal to be repeated and a feedback signal resulting from a feedback channel between the first antenna and a second antenna, cancelling a feedback signal estimate from the input signal to generate an echo-cancelled signal, delaying the echo-cancelled signal to generate a reference signal, generating a numerator value from the echo-cancelled signal, generating a denominator value from the input signal or the reference signal or both, generating a metric being a ratio of the numerator value to the denominator value where the metric is indicative of an IQ imbalance in the repeater's receiver and/or transmitter, and compensating for the IQ imbalance in the repeater's receiver and/or transmitter by applying an adaptive algorithm using the metric.

According to another embodiment of the present invention, a method in an interference cancellation repeater implemented using a zero-IF receiver and a zero-IF transmitter includes receiving an input signal at a first antenna of the repeater where the input signal is a sum of a remote signal to be repeated and a feedback signal resulting from a feedback channel between the first antenna and a second antenna, generating a numerator value being a conjugate auto-correlation function of the input signal, generating a denominator value being an auto-correlation function of the input signal, generating a metric being a ratio of the numerator value to the denominator value where the metric is indicative of an IQ imbalance in the repeater's receiver and/or transmitter; and compensating for the IQ imbalance in the repeater's receiver and/or transmitter by applying an adaptive algorithm using the metric.

According to another embodiment of the present invention, a wireless repeater having a first antenna and a second antenna to receive an input signal and transmit an amplified signal where the input signal is a sum of a remote signal to be repeated and a feedback signal resulting from a feedback channel between the first antenna and the second antenna includes a first receiver circuit being a zero-IF receiver coupled to the first antenna to receive the input signal and to generate digitized input signals at baseband frequency, a first transmitter circuit being a zero-IF transmitter coupled to generate the amplified signal to transmit on the second antenna based on digitized transmit signals at baseband frequency, and a repeater baseband block configured to receive the digitized input signals from the first receiver circuit and to generate the digitized transmit signals for the first transmitter circuit. The repeater baseband block is operative to access a feedback signal estimate, to cancel the feedback signal estimate from the digitized input signals to generate an echo-cancelled signal, and to delay the echo-cancelled signal to generate a reference signal. The repeater baseband block is further operative to generate a metric being a ratio of a numerator value derived from the echo-cancelled signal and a denominator value derived from the input signal or the reference signal or both where the metric is indicative of an IQ imbalance in the repeater's receiver and/or transmitter. In operation, the repeater baseband block applies an adaptive algorithm using the metric to compensate for the IQ imbalance in the first receiver circuit and/or the first transmitter circuit.

According to another embodiment of the present invention, a wireless repeater having a first antenna and a second antenna to receive an input signal and transmit an amplified signal where the input signal is a sum of a remote signal to be repeated and a feedback signal resulting from a feedback channel between the first antenna and the second antenna includes a first receiver circuit being a zero-IF receiver coupled to the first antenna to receive the input signal and to generate digitized input signals at baseband frequency, a first transmitter circuit being a zero-IF transmitter coupled to generate the amplified signal to transmit on the second antenna based on digitized transmit signals at baseband frequency, and a repeater baseband block configured to receive the digitized input signals from the first receiver circuit and to generate the digitized transmit signals for the first transmitter circuit. The repeater baseband block is operative to generate a metric being a ratio of a numerator value being a conjugate auto-correlation function of the input signal and a denominator value being an auto-correlation function of the input signal where the metric is indicative of an IQ imbalance in the repeater's receiver and/or transmitter. In operation, the repeater baseband block applies an adaptive algorithm using the metric to compensate for the IQ imbalance in the first receiver circuit and/or the first transmitter circuit.

DETAILED DESCRIPTION

The nature, objectives, and advantages of the disclosed method and apparatus will become more apparent to those skilled in the art after considering the following detailed description in connection with the accompanying drawings.

Prior art repeaters such as those described above may provide significant advantages for cellular telephone or similar networks. However, existing repeater configurations may not be suitable for some applications. For example, existing repeater configurations may not be suitable for indoor coverage applications (e.g., repeating signals for a residence or business environment) which may require substantially more isolation between the repeater's antennas. Moreover, in some traditional repeater implementations, the target is to achieve as high a gain as reasonable while maintaining a stable feedback loop (loop gain less than unity). However, increasing the repeater gain renders isolation more difficult due to the increased signal leaking back into the donor antenna. In general, loop stability demands require that the signal leaking back into the donor antenna from the coverage antenna be much lower than the remote signal (the signal to be repeated). The maximum achievable signal to noise ratio (SINR) at the output of the repeater is then the same as the SINR at the input to the repeater. High gain and improved isolation form two contradicting demands required for modern day repeaters, especially those for indoor applications.

In some traditional repeaters, interference cancellation or echo cancellation is used to improve the isolation between the repeaters' donor and coverage antennas. Digital baseband interference cancellation is often employed in traditional repeaters to realize active isolation in the repeater, enabling the ability to achieve higher overall isolation and higher gain. Conventional digital baseband interference cancellation or echo cancellation is implemented by using samples of the transmit signal, in digital baseband, in conjunction with samples of the receive signals, also in digital baseband, to estimate the feedback channel (or the "leakage channel") between the donor antenna and the server antenna. The feedback channel estimate is then used to generate an estimated feedback signal, also referred to as the "estimated leakage signal." The estimated feedback signal is then subtracted from the receive signal to actively cancel the interference, thereby allowing higher gain to be used while preventing oscillation. Effective echo cancellation requires very accurate channel estimation. In general, the more accurate the channel estimate, the higher the cancellation and hence the higher the effective isolation. Herein, "interference cancellation" or "echo cancellation" refers to techniques that reduce or eliminate the amount of leakage signal between repeater antennas; that is, "interference cancellation" refers to cancellation of an estimated leakage signal, which provides for partial or complete cancellation of the actual leakage signal.

However, real world impairments in practical receiver and transmitter circuitry of the repeater limit the performance of conventional interference cancellation repeaters. In particular, in interference cancellation repeaters utilizing a zero-IF (direct conversion) radio architecture, the signal to noise ratio as well as the stability of the repeater will be affected by the IQ imbalance of the receiver and the transmitter in the repeater. The interference cancellation operation provides for improvement of the gain of a repeater by the cancellation of the feedback signal being the repeater's own transmitted signal. Cancellation of the feedback or leakage signal allows for stability at higher gain levels. However, RF distortions resulting from IQ imbalance in the repeater's transceivers will not generally be cancelled by the interference cancellation operation. The image signal that remains due to the RF distortions degrades the quality of the repeater signal.

A "zero-IF" or "direct conversion" receiver refers to a receiver receiving an analog input signal and generating in-phase and quadrature-phase I and Q signals for the repeater baseband. The zero-IF or direct conversion receiver downconverts the analog signals directly to baseband (IF=0 MHz) in one frequency conversion step. Similarly, a zero-IF transmitter refers to a transmitter receiving in-phase (I) and quadrature-phase (Q) signals from the repeater baseband. The zero-IF or direct conversion transmitter upconverts and combines the in-phase and quadrature-phase I and Q signals from baseband to the transmission frequency in one frequency conversion step. Many challenges exist for utilizing the zero-IF radio architecture in a transceiver, including the IQ imbalance problem.

IQ imbalance is caused by the amplitude and phase mismatches of the two physical analog signal paths (I and Q) of the zero-IF receiver and transmitter. These mismatches arise from imperfections and finite tolerances of the analog front-end components of the receiver, such as filters, mixers and amplifiers. The mismatches are generally unavoidable. IQ mismatches decrease the image rejection ratio (IRR) of the receiver, resulting in crosstalk or interference between mirror frequencies.

IQ imbalance compensation techniques are known. Most conventional IQ imbalance compensation techniques operate by shutting off normal operations of the transceivers to calibrate the transceivers. The calibration may be performed using a test signal and taking measurements while the repeater's normal operation is inhibited.

Systems and techniques herein provide for an IQ imbalance compensation system and method for an interference cancellation repeater employing the zero-IF radio architecture which employs a metric and an adaptive algorithm to compensate for IQ imbalance in real time, i.e. while the repeater is running in normal operation. An IQ imbalance compensation scheme for an interference cancellation repeater has to operate under various system constraints, including the inability to make direct measurements of the IQ imbalance, and having IQ imbalance from multiple sources, such as from the base station, the receiver and the transmitter, all blended together. Furthermore, the phase of the I and Q signals may be rotated randomly based on the receive phase of the signal transmitted by the base station transmitter and there may be phase shift of the feedback signal from the repeater transmitter to the repeater receiver. In accordance with the system and method of the present invention, a metric for IQ imbalance compensation is provided which ignores the base station transmitter IQ imbalance, ignores the phase shift in the feedback signal from the repeater transmitter to the repeater receiver and ignores the varying gain levels of the feedback signal. The metric for IQ imbalance compensation allows for the use of an adaptive algorithm to minimize the metric, i.e. the IQ imbalance, to acceptable levels. In this manner, effective IQ imbalance compensation for an zero-IF repeater is realized.

Figure 2:
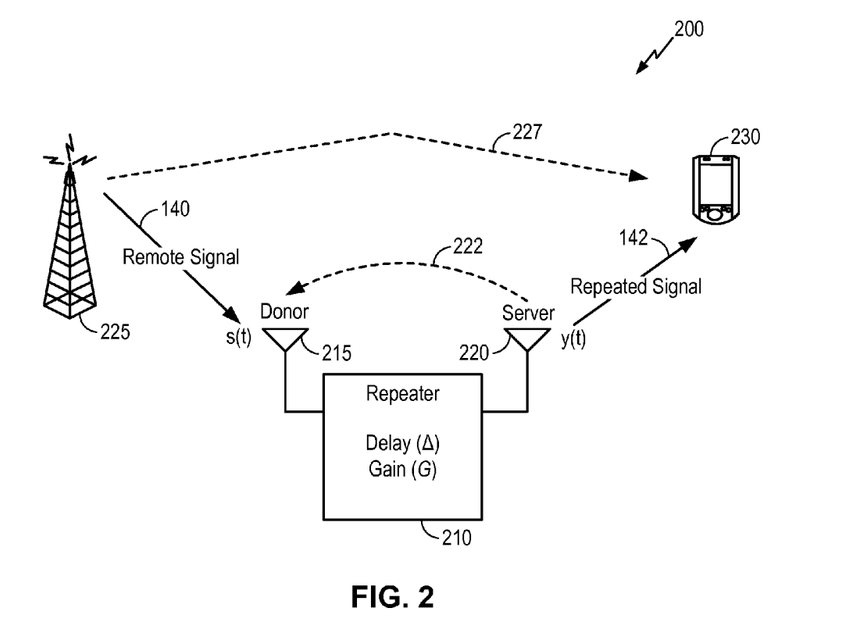
FIG. 2 shows a diagram of a repeater environment according to some embodiments of the current disclosure.

FIG. 2 shows a diagram of an operating environment 200 for a repeater 210 according to embodiments of the current disclosure. The example of FIG. 2 illustrates forward link transmissions; i.e., a remote signal 140 from a base station 225 is intended for a mobile device 230. A repeater, such as repeater 210, may be used in environment 200 if an un-repeated signal along the path 227 between base station 225 and mobile device 230 would not provide sufficient signal for effective voice and/or data communications received at mobile device 230. Repeater 210 with a gain G and a delay Δ is configured to repeat a signal received from base station 225 on a donor antenna 215 to mobile device 230 using a server antenna 220. Repeater 210 includes forward link circuitry for amplifying and transmitting signals received from the base station 225 to mobile device 230 through donor antenna 215 and server antenna 220. Repeater 210 may also include reverse link circuitry for amplifying and transmitting signals from mobile device 230 back to base station 225. At repeater 210, the remote signal s(t) is received as an input signal and the remote signal s(t) is repeated as a repeated or amplified signal y(t) where y(t)=√Gs(t-Δ). Ideally, the gain G would be large, the inherent delay Δ of the repeater would be small, the input SINR would be maintained at the output of repeater 210 (this can be of particular importance for data traffic support), and only desired carriers would be amplified.

In practice, the gain of repeater 210 is limited by the isolation between donor antenna 215 and server antenna 220. If the gain is too large, the repeater can become unstable due to signal leakage. Signal leakage refers to the phenomenon where a portion of the signal that is transmitted from one antenna (in FIG. 2, server antenna 220) is received by the other antenna (in FIG. 2, donor antenna 215), as shown by the feedback path 222 in FIG. 2. Without interference cancellation or other techniques, the repeater would amplify this feedback signal, also referred to as the leakage signal, as part of its normal operation, and the amplified feedback signal would again be transmitted by server antenna 220. The repeated transmission of the amplified feedback signal due to signal leakage and high repeater gain can lead to repeater instability. Additionally, signal processing in repeater 210 has an inherent non-negligible delay Δ. The output SINR of the repeater is dependent on RF non-linearities and other signal processing. Thus, the aforementioned ideal repeater operational characteristics are often not attained. Finally, in practice, the desired carriers can vary depending on the operating environment or market in which the repeater is deployed.

The communication system in which the repeater of the present invention can be deployed includes various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Repeater Architecture

The operation of an interference cancellation repeater is first described. In some embodiments, a repeater employing interference cancellation or echo cancellation uses the transmit signal as the pilot or reference signal for estimating the feedback channel and also for echo cancellation. For the purpose of estimating the feedback channel, the transmit signal is the pilot and the remote signal is treated as noise. The received signal of the repeater is the remote signal plus the feedback signal. The transmit signal is fed into the channel estimation algorithm and the resulting channel estimate ($\tilde{h}$) is used to generate a replica of the feedback signal—that is, the portion of the transmit signal that was echoed back to the donor antenna. The estimated feedback signal is then subtracted from the received signal to cancel out the undesired feedback signal at the input to the repeater. Echo cancellation is thus realized in the repeater.

Figure 3:
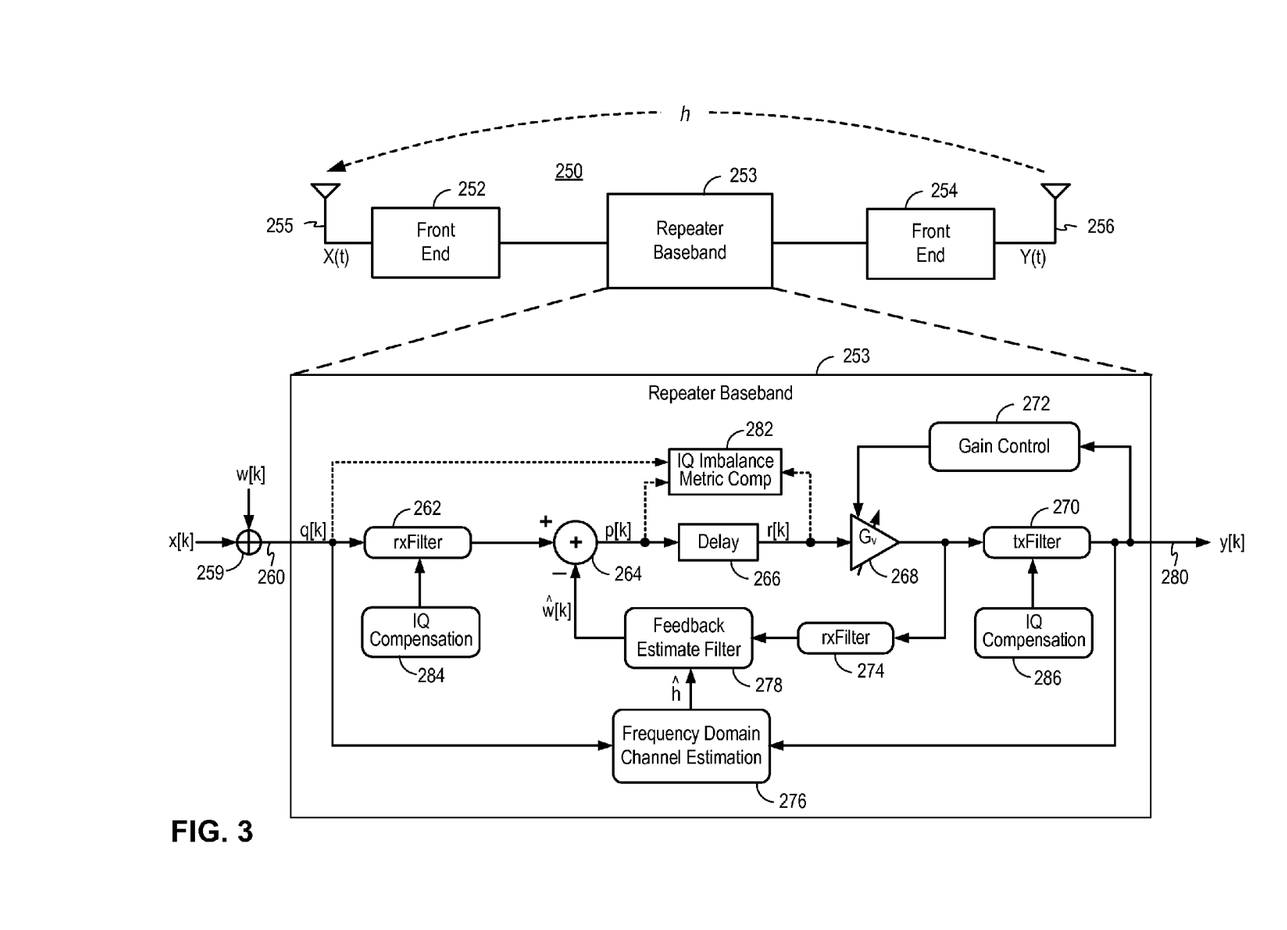
FIG. 3 is a schematic diagram of an interference cancellation repeater incorporating the IQ imbalance compensation system and method according to one embodiment of the present invention.

FIG. 3 is a schematic diagram of an interference cancellation repeater incorporating the IQ imbalance compensation system and method according to one embodiment of the present invention. Referring to FIG. 3, an echo-cancellation repeater 250 receives a remote signal X(t) on a donor antenna 255 to be repeated and generates an output signal Y(t) to be transmitted on a server antenna 256. The repeater 250 includes a first front-end circuit 252 coupled to the donor antenna 255, a second front-end circuit 254 coupled to the server (or coverage) antenna 256, and a repeater baseband block 253 coupled between the first and second front-end circuits.

The first and second front-end circuits 252, 254 incorporate digital and analog front-end processing circuitry for implementing the receive and transmit functions of the wireless repeater. In the present embodiment, the repeater 250 is a zero-IF repeater and the first and second front-end circuits 252, 254 implement a zero-IF radio architecture. That is, the front-end circuits 252, 254 operate to downconvert the incoming analog signal directly to baseband in one frequency conversion step and operate to upconvert the outgoing signal from baseband to the transmission frequency in one frequency conversion step. In one embodiment, the first and second front-end circuits 252, 254 each include variable gain amplifiers, filters, mixers, drivers and digital signal processors, such as analog-to-digital converters. The specific implementation of the repeater front-end circuits 252, 254 is not critical to the practice of the present invention and any receiver/transmitter front-end processing circuitry, presently known or to be developed, can be applied in the wireless repeater of the present invention.

In operation, signal leakage from the server antenna 256 back to the donor antenna 255 of the repeater 250 causes part of the output signal Y(t) to be leaked back through a feedback channel h and added to the remote signal X(t) before the signal is received by the repeater. Thus, the repeater 250 actually receives a composite receive signal being the sum of the remote signal X(t) and the feedback signal where the feedback signal is basically an attenuated version of the output signal Y(t).

The repeater 250 includes the repeater baseband block 253 where channel estimation, baseband echo cancellation, and gain control operations are implemented. Details of the repeater baseband block 253 are illustrated in FIG. 3. The repeater baseband block 253 receives a receive signal q[k] and generates an output signal y[k]. The receive signal q[k] is a composite receive signal being the sum of the remote signal x[k] to be repeated and a feedback signal w[k] resulting from the feedback channel between the donor antenna 255 and the server antenna 256, as described above. The repeater 250, being an echo-cancellation repeater, operates to estimate the feedback signal in order to cancel out the undesired feedback signal component in the receive signal. At the repeater baseband block 253, the receive signal q[k] is denoted as the sum of the digitized remote signal x[k] and the leakage signal w[k]. The summer 259 in FIG. 3 is illustrative only and is used to represent the combination of the remote signal x[k] and the feedback signal w[k] to form the composite receive signal q[k]. Summer 259 is symbolic only and does not represent an actual signal summer in the repeater circuitry.

In the repeater baseband block 253, the receive signal q[k] ("the input signal") on input node 260 is coupled to a receive filter 262 ("rxFilter"). In one embodiment, receive filter 262 is a tunable, digital baseband receive filter to enable appropriate filtering of the received waveform. Furthermore, receive filtering enables selective amplification of the received waveform. The filtered receive signal is coupled to an echo-canceller implementing frequency domain echo cancellation. In the present embodiment, the echo-canceller includes a summer 264 which operates to subtract a feedback signal estimate $\hat{w}[k]$ from the filtered receive signal. As long as the feedback signal estimate is accurate, all or some of the undesired feedback signal is removed from the receive signal and echo cancellation is realized.

The post cancellation signal p[k], also referred to as the echo-cancelled signal, is coupled through a delay element 266 having a delay D1. The delay element 266 introduces a sufficient amount of delay to decorrelate the echo-cancelled signal from the desired remote signal x[k] while maximizing the correlation between the reference signal and the leakage signal component of the composite receive signal. The delayed echo-cancelled signal r[k] is coupled to a variable gain stage 268 providing a variable gain of $G_v$. The variable gain stage 268 is controlled by a gain control block 272 for adjusting the gain of repeater 250 through baseband gain modifications. In the present embodiment, the gain control block 272 implements digital gain control using the output signal y[k] as the reference signal and using one or more gain control algorithms, currently known or to be developed. The gain control block 272 is capable of providing fast oscillation detection to ensure that the stability of the repeater is well controlled.

The amplified echo-cancelled signal is coupled to a transmit filter 270 ("txFilter") to generate the output signal y[k] on an output node 280. In one embodiment, the transmit filter 270 is a tunable, digital baseband transmit filter to enable appropriate filtering of the transmitted waveform. The output signal y[k] from the repeater baseband block 253 is coupled to the second front-end circuit 254 to be transmitted onto server antenna 256 as the final output signal Y(t).

To implement echo cancellation, the repeater baseband block 253 includes a channel estimation block 276 which operates to estimate the feedback channel h, and generate a feedback channel estimate $\hat{h}$. The echo canceller in the repeater baseband block 253 further includes a feedback signal estimate computation block (or "feedback estimate filter") 278 which uses the feedback channel estimate $\hat{h}$ from the channel estimation block 276 to compute the feedback signal estimate $\hat{w}[k]$. In the present embodiment, the reference signal used for channel estimation is the output signal y[k] and the reference signal used in the feedback signal estimation is the amplified echo-cancelled signal. The reference signal for feedback signal estimation is coupled through a receive filter 274 before being used by the feedback estimate filter 278 to compute the feedback signal estimate. In this manner, the feedback signal estimate incorporates the same characteristics of the receive filter. In other embodiments, the reference signal used for channel estimation and feedback signal estimation can be the same reference signal or different reference signals. Furthermore, the reference signal[s] can be taken before or after the gain stage 268 or the reference signal[s] can be taken before or after the transmit filter. The exact point where the reference signal[s] is taken is not critical to the practice of the present invention as long as the reference signal is a delayed echo-cancelled signal, such as signal r[k].

In one embodiment, the channel estimation circuit 276 employs frequency domain channel estimation. The feedback channel estimate $\hat{\mathbf{h}}$ as thus computed is coupled to the feedback signal estimate block 278. Feedback signal estimate block 278 performs a convolution of the feedback channel estimate $\hat{\mathbf{h}}$ with the reference signal after passing through the receive filter 274 to generate the feedback signal estimate $\hat{w}[k]$. The feedback signal estimate $\hat{w}[k]$ is coupled to summer 264 to be subtracted from the receive signal to realize echo-cancellation of the receive signal. Accordingly, the repeater 250 increases the effective isolation between the donor antenna and the server antenna through baseband interference cancellation. With accurate baseband echo cancellation, the repeater 250 is capable of being operated at a high gain level as compared to conventional repeater devices.

In the embodiment shown in FIG. 3, elements of the repeater baseband block 253 assumed a given arrangement. In other embodiments of the present invention, the elements of repeater baseband block 253 can assume other configurations to realize the same channel estimation and echo cancellation functions. The exact order of arrangement of the elements in repeater baseband block 253 is not critical to the practice of the present invention.

According to embodiments of the present invention, the repeater 250 implements real-time IQ imbalance compensation method and system of the present invention to correct for and compensation of the imbalance between the in-phase and quadrature-phase I and Q signals at the repeater baseband. More specifically, an IQ imbalance compensation metric is generated (block 282) based on one or more of the composite receive signal q[k], the echo-cancelled signal p[k] and the reference signal r[k]. Then, an adaptive algorithm is applied to optimize the IQ imbalance compensation metric and IQ imbalance compensation is implemented at the receive filter 262 and the transmit filter 270 through IQ imbalance compensation blocks 284 and 286. More specifically, the IQ imbalance compensation blocks 284, 286 adjust the filter coefficients of the receive filter 262 and the transmit filter 270 to implement IQ imbalance compensation. The details of the IQ imbalance compensation metrics and compensation schemes will be described in more detail below.

IQ Imbalance Compensation Metric

Figure 4:
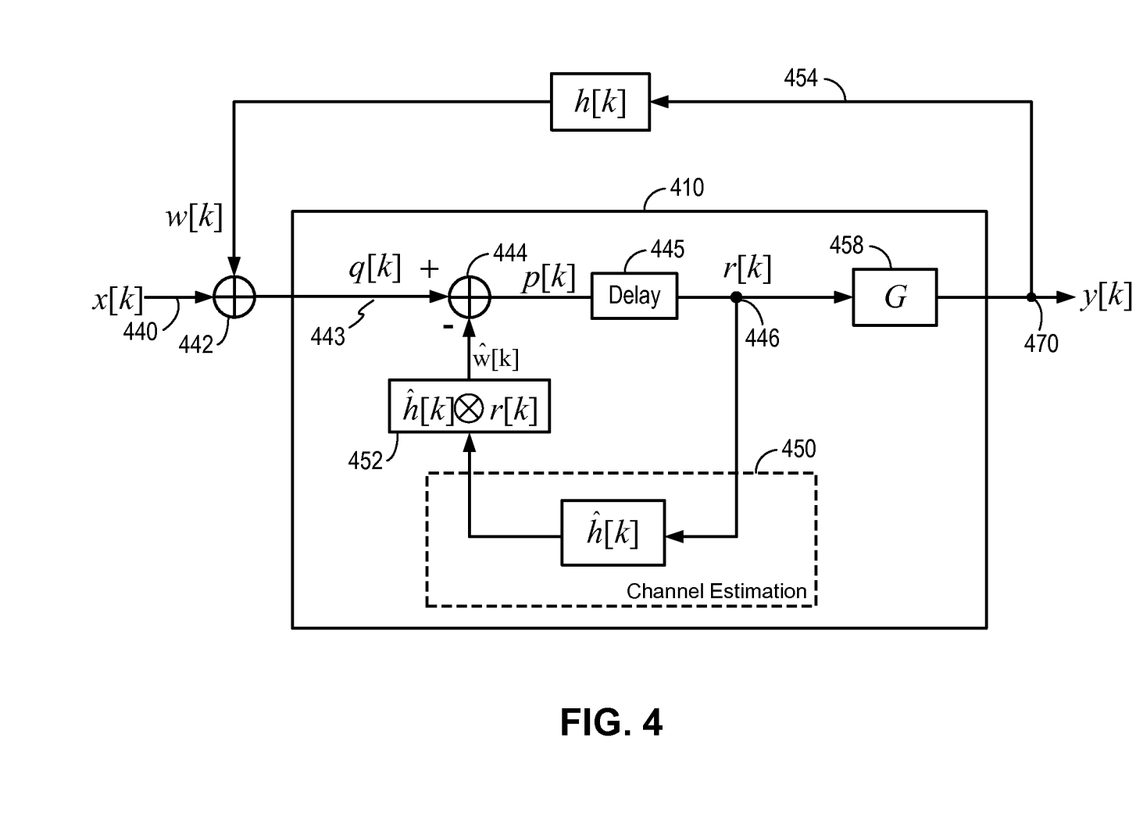
FIG. 4 is a representation of an echo cancellation repeater according to one embodiment of the present invention.

FIG. 4 is a representation of an echo cancellation repeater according to one embodiment of the present invention. Referring to FIG. 4, an echo-cancellation repeater 410 receives a remote signal x[k] to be repeated on a donor antenna (denoted as input node 440) and generates an output signal y[k] to be transmitted on a server antenna (denoted as output node 470). Signal leakage from the server antenna back to the donor antenna causes part of the output signal y[k] to be leaked back and added to the remote signal before being received by the repeater. The signal leakage is represented as a feedback channel h[k], denoted as a signal path 454 between output node 470 and the input node 440. Thus, the repeater 410 actually receives as the input signal on a node 443 a receive signal q[k] being the sum of the remote signal x[k] and the feedback signal w[k]. The feedback channel h[k] thus form a feedback loop in repeater 410 between the donor antenna and the server antenna. A summer 442 in FIG. 4 is symbolic only to illustrate the signal components of composite receive signals q[k] and does not represent an actual signal summer in the operating environment of repeater 410.

The repeater 410, being an echo-cancellation repeater, operates to estimate the feedback signal w[k] in order to cancel out the undesired feedback signal component in the receive signal ("the input signal"). To that end, the repeater 410 includes an echo canceller formed by a summer 444 and a channel estimation block 450. The receive signal q[k] is coupled to summer 444 which operates to subtract a feedback signal estimate ŵ[k] from the receive signal q[k]. As long as the feedback signal estimate ŵ[k] is accurate, the undesired feedback signal w[k] is removed from the receive signal and echo cancellation is realized. In the present embodiment, the echo-cancelled signal p[k] is coupled to a delay element 445 to introduce a given delay to the echo-cancelled signal. A delayed echo-cancelled signal r[k] is then coupled to a variable gain stage 458 providing a gain of G to the post cancellation signal. The gain stage 458 generates the output signal y[k] on the output node 470 for transmission on the server antenna. FIG. 4 illustrates only elements that are relevant to operation of the echo cancellation operation of the repeater. Repeater 410 may include other elements not shown in FIG. 4 but known in the art to realize the complete repeater operation.

Feedback signal estimate ŵ[k] is generated based on a feedback channel estimate ĥ[k] where the feedback channel estimate is generated by a channel estimation block 450. In the present embodiment, the channel estimation block 450 takes as an input signal the receive signal q[k] and uses the delay echo-cancelled signal r[k] as the reference signal for channel estimation to generate the feedback channel estimate ĥ[k]. Then, echo canceller computes the feedback signal estimate ŵ[k] based on the feedback channel estimate ĥ[k]. More specifically, the feedback signal estimate ŵ[k] is obtained by convolving the feedback channel estimate ĥ[k] with the reference signal r[k] (i.e., ŵ[k]=ĥ[k]⊗r[k]). The feedback signal estimate ŵ[k] is used for echo cancellation at summer 444. More specifically, the feedback signal estimate ŵ[k] is subtracted from the receive signal q[k] to generate the echo-cancelled signal p[k]. It is imperative to note that FIG. 4 illustrates one method for implementing echo cancellation in a repeater. FIG. 4 is illustrative and is not intended to be limiting. An echo cancellation wireless repeater of the present invention can implement other methods for echo cancellation. The exact method of echo cancellation used in the repeater is not critical to the practice of the present invention.

According to one aspect of the present invention, an IQ imbalance compensation metric is derived based on the image rejection ratio (IRR) of the repeater. In some embodiments, the IQ imbalance compensation metric is derived from the auto-correlation function (ACF) and conjugate correlation functions for determining IRR. In some embodiments, a conjugate auto-correlation function (CACF) is used. In other embodiments, a conjugate cross-correlation function (CCCF) is used. In particular, in some embodiments, cross-correlation functions, both normal and conjugate, are used. The use of normal and conjugate cross-correlation functions allows for measurement of repeater RF images despite images being present in the desired signal. The use of normal and conjugate cross-correlation functions also allow for processing gain against the desired signal and more accurate measurement of the image levels.

In one embodiment, the IRR of the repeater is defined as:

$$IRR = 20\log_{10}\left(\frac{|CACF|}{|ACF|}\right).$$

In some embodiments, the IQ imbalance compensation metric is based on the IRR of the repeater and is defined as a ratio having a numerator value derived from the echo-cancelled signal and a denominator value derived from the composite receive signal and/or the reference signal.

In a first embodiment, an IQ imbalance compensation metric (Metric (1)) is given as:

$$IRR = 20\log_{10}\left(\frac{|CCCF(p,r)|}{|CCF(q,r)|}\right). \quad \text{Metric (1)}$$

Metric (1) has a numerator value being the conjugate cross-correlation function (CCCF) of the echo-cancelled signal p[k] and the reference signal r[k]. The metric has a denominator value being the cross-correlation function (CCF) between the composite receive signal q[k] and the reference signal r[k]. Metric (1) metric will normalize the leakage variation and also provide processing gain versus newly received signals.

In a second embodiment, an IQ imbalance compensation metric (Metric (2)) is given as:

$$IRR = 20\log_{10}\left(\frac{|CACF(r)|}{|ACF(q)|}\right). \quad \text{Metric (2)}$$

Metric (2) has a numerator value being the conjugate auto-correlation function (CACF) of the reference signal r[k]. The metric has a denominator value being the auto-correlation function (ACF) of the composite receive signal q[k]. Metric (2) will normalize the leakage variation but does not provide processing gain versus the newly received signal. Metric (2)

is capable of being minimized at high gain level where the repeater operation is more critical.

In a third embodiment, an IQ imbalance compensation metric (Metric (3)) is given as:

$$IRR = 20\log_{10}\left(\frac{|CACF(q)|}{|ACF(q)|}\right).$$ Metric (3)

Metric (3) has a numerator value being the conjugate autocorrelation function (CACF) of the composite receive signal q[k]. The metric has a denominator value being the autocorrelation function (ACF) of the composite receive signal. Metric (3) is useful when the repeater does not perform echo cancellation. Alternately, Metric (3) is useful when the repeater is configured to implement IQ imbalance compensation before echo cancellation.

The use of an IRR based metric in an interference cancellation repeater for IQ imbalance compensation has not been done prior to the present invention. The IQ imbalance compensation metrics of the present invention select the signal components that provide accurate indication of IQ imbalance. When different signals are used in the numerator and the denominator of the metric, processing gain is realized. The IQ imbalance compensation metrics described above are capable of compensating for IQ imbalance in both the receiver circuit and in the transmitter circuit of the repeater.

IQ Imbalance Compensation Method

Figure 5:
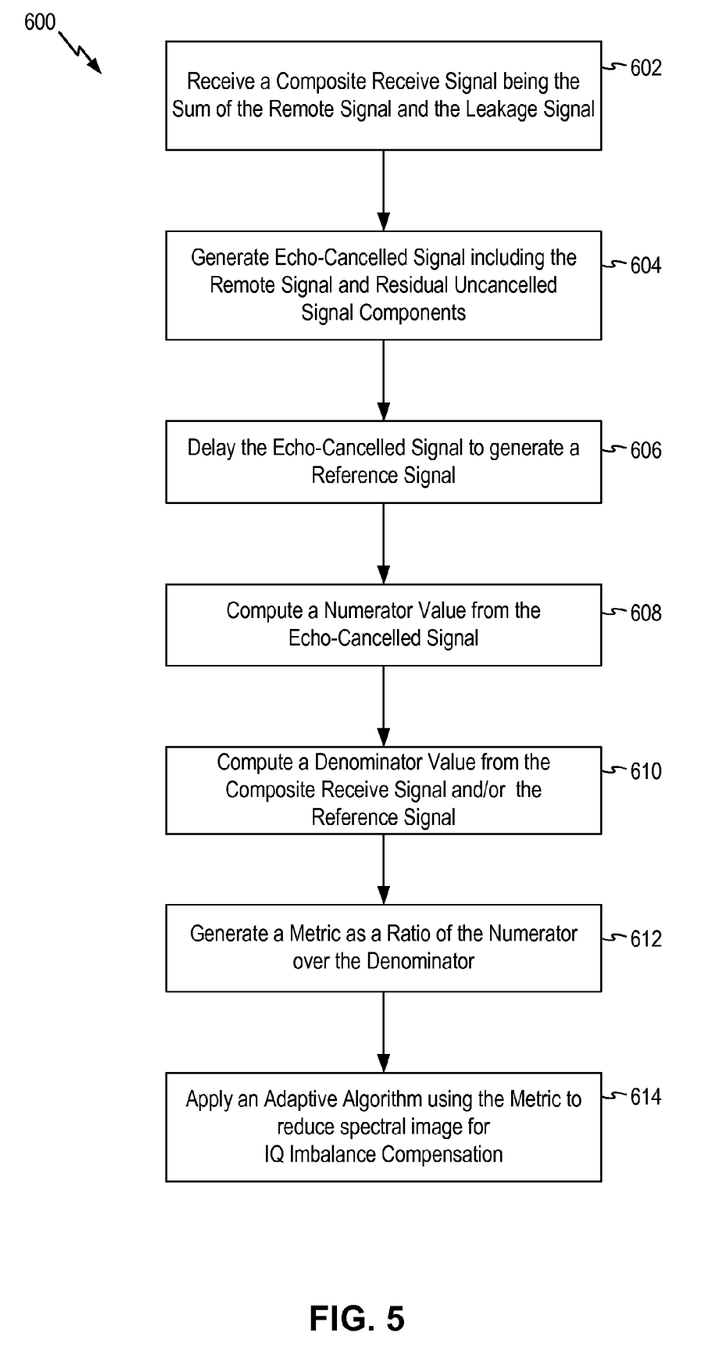
FIG. 5 is a flow chart illustrating a method to compensate for the IQ imbalance of an interference cancellation repeater implemented using zero-IF radio architecture according to one embodiment of the present invention.

According to one aspect of the present invention, a method to compensate for the IQ imbalance of an interference cancellation repeater implemented using zero-IF radio architecture is illustrated in the flow chart of FIG. 5. Referring to FIG. 5, IQ imbalance compensation method 600 starts by receiving a composite receive signal q[k] being the sum of the desired signal to be repeated, i.e. the remote signal x[k], and a leakage signal w[k] (step 602). Then, echo cancellation is performed to generate an echo-cancelled signal p[k] (step 604). The echo-cancelled signal includes the desired signal x[k] and remaining uncancelled signal components comprised in part of RF impairments, such as IQ imbalance, from the repeater's receiver and transmitter. Then, the echo-cancelled signal is delayed to generate a reference signal r[k] (step 606).

Method 600 then proceeds to generate an IRR based metric for providing IQ imbalance compensation. A numerator value for the metric is derived at least in part from echo-cancelled signal (step 608). A denominator value for the metric is derived at least in part from the one or more of the composite receive signal q[k] and the reference signal r[k] (step 610). In the case where the repeater does not perform echo cancellation or where the repeater performs IQ imbalance compensation before echo cancellation, the numerator value for the metric can be derived from the composite receive signal q[k].

Then, the IQ imbalance compensation metric is generated based on the ratio of the numerator to the denominator (step 612). The metric is indicative of a level of spectral image caused by the repeater's receiver or transmitter IQ imbalance. In some embodiments, an adaptive algorithm utilizes the metric to reduce the amount of spectral image resulting from the IQ imbalance in the repeater's transmitter and/or receiver, thereby providing compensation for the IQ imbalance (step 614). In some embodiments, IQ imbalance compensation is realized by modifying the coefficients of the receive filter and transmit filter in the receive baseband block. In one embodiment of the present invention, a MMSE (minimum mean square error) algorithm is applied to the IQ imbalance compensation metric to minimize the undesired spectral image. In another embodiment, a LMS (least mean squares) algorithm is applied to the IQ imbalance compensation metric. In other embodiments, other adaptive algorithms can be used with the IQ imbalance compensation to minimize the undesired spectral image. The adaptive algorithm generates compensation values used to modify the filter coefficients of the receive filter and the transmit filter to compensate for the IQ imbalance in the repeater's receiver and/or transmitter.

System Architecture

Figure 6:
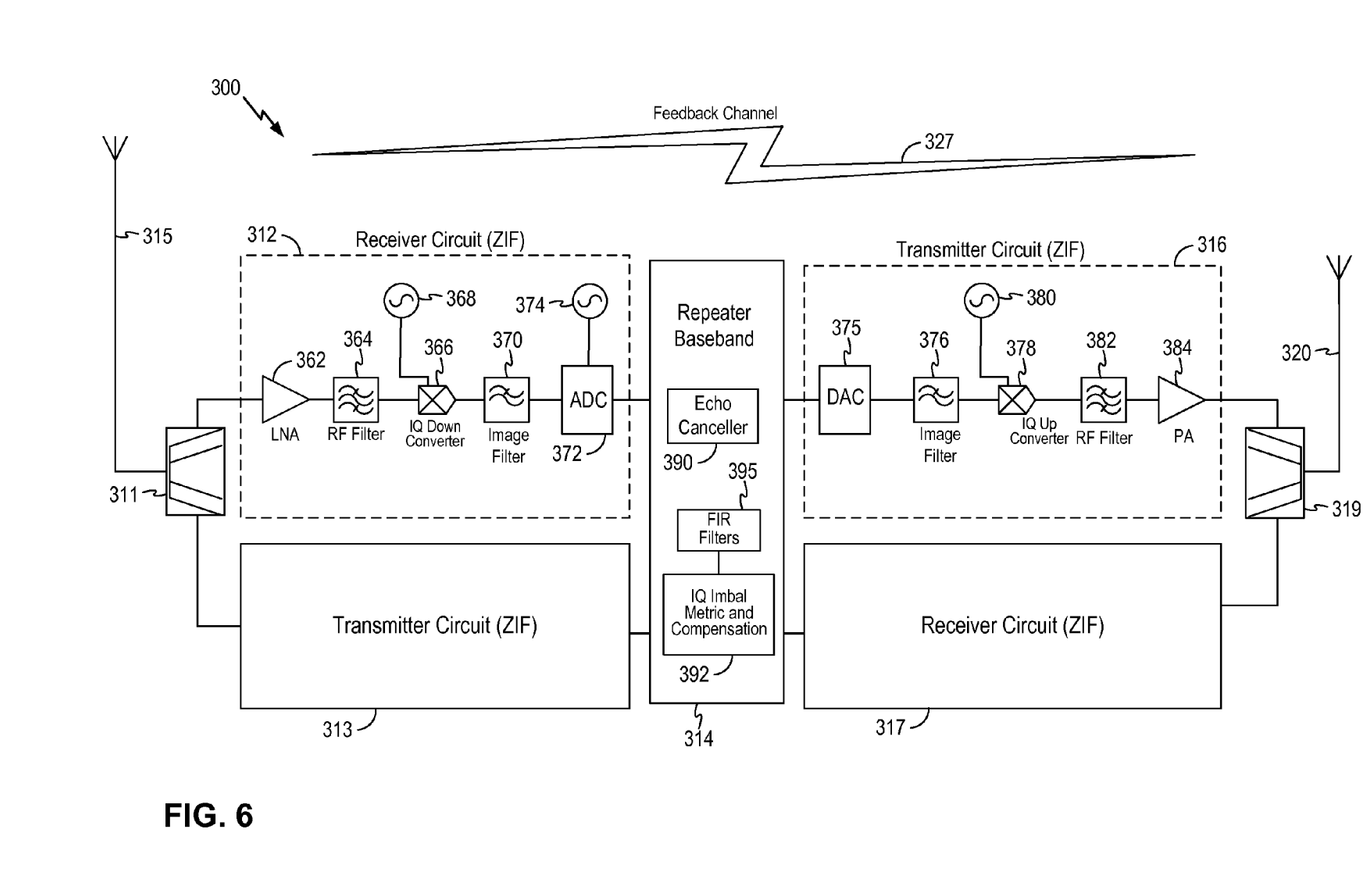
FIG. 6 is schematic diagram of an interference cancellation repeater employing zero-IF radio architecture and incorporating the IQ imbalance compensation scheme according to one embodiment of the present invention.

FIG. 6 is schematic diagram of an interference cancellation repeater employing zero-IF radio architecture and incorporating the IQ imbalance compensation scheme according to one embodiment of the present invention. For simplicity, FIG. 6 illustrates only the details of the forward link circuitry of a repeater 300 for receiving a remote signal on a donor antenna 315 and transmitting the amplified signal on a server antenna 320. The details of reverse link circuitry for transmission in the reverse direction are omitted but it is understood that the repeater contains the reverse link circuitry is implemented in the same manner as the forward link circuitry. In the embodiment shown in FIG. 6, donor antenna 315 is coupled to a duplexer 311 operative to connect the donor antenna to either a receiver circuit 312 for receiving forward link communications or to a transmitter circuit 313 for transmitting reverse link communications. Similarly, server antenna 320 is coupled to a duplexer 319 operative to connect the server antenna to either a transmitter circuit 316 for transmitting forward link communications or to a receiver circuit 317 for receiving reverse link communications. In this manner, duplexers 311 and 319 each connects to a receiver circuit and a transmitter circuit to enable bi-directional (duplex) communication over the communication channel.

As shown in FIG. 6, a receiver circuit 312 (also referred to as the "receiver") receives from duplexer 311 a receive signal (sometimes referred to as "an input signal") being the remote signal to be amplified plus any feedback signal from the feedback channel 327 between the donor and server antennas. In the present embodiment, the receiver 312 is implemented as a direct-conversion receiver or a zero-IF receiver. The receiver 312 includes a low noise amplifier 362, an RF filter 364, an IQ down-converter 366 driven by a local oscillator 368, an image filter 370, and finally an analog-to-digital converter 372 driven by a local oscillator 374 to digitize the incoming signal. In one embodiment, the RF filter 364 is an RF SAW filter. In other embodiments, the RF filter 364 may be implemented using a ceramic filter or a FBAR filter or other suitable filters. The digitized signal is coupled to a repeater baseband block 314. The repeater baseband block 314 performs echo cancellation and signal amplification of the receive signal. The repeater baseband block 314 generates an echo cancelled digital transmit signal to be transmitted as the amplified signal on the server antenna 320. A transmitter circuit 316 (also referred to as the "transmitter") receives the digital transmit signal which is a digital baseband signal. In the present embodiment, the transmitter 316 is implemented as a direct-conversion transmitter or a zero-IF transmitter. The transmitter 316 includes a digital-to-analog converter 375, an image filter 376, an IQ up-converter 378 driven by a local oscillator 380, an RF filter 382 and a power amplifier (PA) 384. In one embodiment, the RF filter 382 is an RF SAW filter. In other embodiments, the RF filter 382 may be implemented using a ceramic filter or a FBAR filter or other suitable filters. The transmitter 316 generates the RF transmit signal from the digital transmit signal and provides the RF transmit signal to duplexer 319 to be transmitted on antenna 320.

In repeater 300, channel estimation for echo cancellation is performed in the repeater baseband block 314. In the repeater baseband block 314, the feedback channel is estimated using digital samples of the transmit signal as the reference signal and also using digital samples of the receive signal. The channel estimate is then used to estimate the feedback signal using the digital samples of the transmit signal. The estimated feedback signal is then used to cancel out the undesired feedback signal in the receive signal, thereby providing active isolation and improving stability.

According to one aspect of the present invention, the repeater 300 implements the IQ imbalance compensation method and system of the present invention. The repeater baseband block 314 includes an IQ imbalance compensation metric computation and compensation block 392. One of the above-described IRR-based metric is applied as an indicator of the level of spectral image caused by the repeater's receiver or transmitter IQ imbalance. An adaptive algorithm is applied to minimize the metric and generate compensation values to be applied to FIR (finite impulse response) filters 395 in the repeater baseband 314. FIR filters 395 implements the receive and transmit filters of the repeater baseband 314. In this manner, IQ imbalance compensation is realized.

Figure 7:
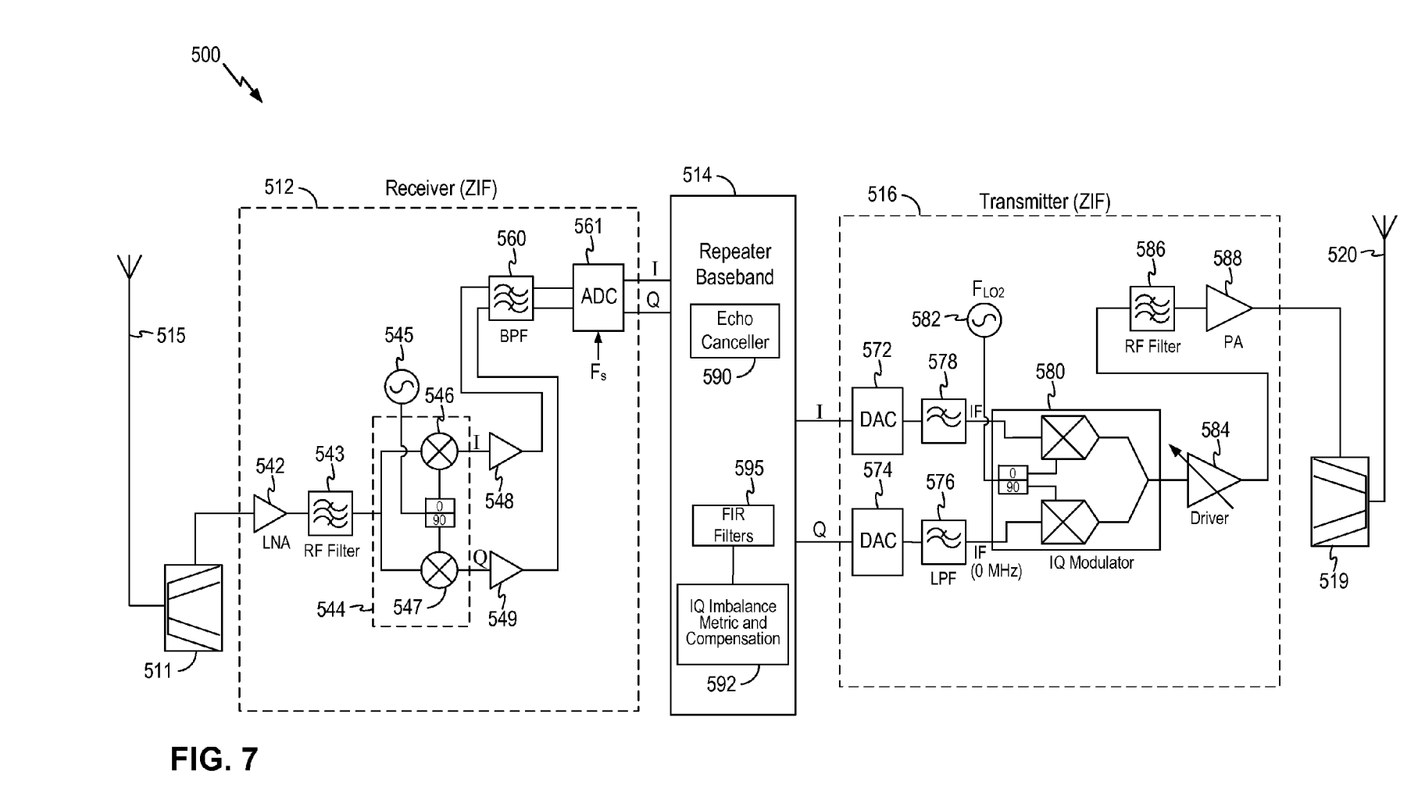
FIG. 7 is schematic diagram of an interference cancellation repeater employing zero-IF radio architecture and incorporating the IQ imbalance compensation scheme according to an alternate embodiment of the present invention.

FIG. 7 is schematic diagram of an interference cancellation repeater employing zero-IF radio architecture and incorporating the IQ imbalance compensation scheme according to an alternate embodiment of the present invention. Referring to FIG. 7, a repeater 500 includes a donor antenna 515 connected to a duplexer 511 and a server antenna 520 connected to a duplexer 519. In the present illustration, only the forward link circuitry of repeater 500 for receiving a remote signal on donor antenna 515 and transmitting the amplified signal on a server antenna 520 is shown. The reverse link circuitry for transmission in the reverse direction is omitted in the present illustration to simplify the drawing. It is understood that the repeater contains both forward link and reverse link circuitry for complete repeater functionality. In FIG. 7, donor antenna 515 is shown coupled to duplexer 511 operative to connect the donor antenna to either a receiver circuit for receiving forward link communications or to a transmitter circuit (not shown) for transmitting reverse link communications. Similarly, server antenna 520 is shown coupled to duplexer 519 operative to connect the server antenna to either a transmitter circuit 516 for transmitting forward link communications or to a receiver circuit (not shown) for receiving reverse link communications. It is understood that duplexers 511 and 519 each connects to a receiver circuit and a transmitter circuit to enable bi-directional (duplex) communication over the communication channel.

Repeater 500 includes a receiver circuit 512, a repeater baseband block 514 and a transmitter circuit 516. The receiver circuit 512 is configured as a direct conversion receiver or zero-IF receiver and the transmitter circuit 516 is configured as a zero-IF transmitter (or a direct-conversion transmitter). The receiver circuit 512 (also referred to as the "receiver") receives an input signal from duplexer 511. The receive signal (or the "input signal") includes the remote signal to be amplified as well as any feedback signal from the feedback channel. The receiver 512 includes a low noise amplifier 542 for amplifying the receive signal, an RF filter 543 for filtering the receive signal, and an IQ downconverter 544 driven by a local oscillator 545 to downconvert the receive signal to an in-phase I signal and a quadrature-phase Q signal at baseband (IF=0 MHz) using mixers 546 and 547. The I and Q signals are coupled to amplifiers 548 and 549, respectively, for amplifying the I and Q signals. The amplified I and Q signals are then coupled to a bandpass filter 560 to filter the amplified I and Q signals. Finally, an analog-to-digital converter 561 digitizes the filtered and amplified I and Q signals at a sampling frequency of $F_s$. The digitalized I and Q signals are then coupled to the repeater baseband block 514. In one embodiment, RF filter 543 may be an RF SAW filter. In other embodiments, RF filter 543 may be implemented using a ceramic filter or a FBAR filter or other suitable filters.

The repeater baseband block 514 performs echo cancellation and amplification of the input signal. The repeater baseband block 514 generates digital transmit signals to be transmitted as the amplified signal on the server antenna 520. The transmitter circuit 516 (also referred to as the "transmitter") is a direct-conversion transmitter and receives the in-phase I and quadrature-phase Q digital transmit signals from the repeater baseband block 514. The transmitter 516 includes a pair of digital-to-analog converters 572, 574 to convert the in-phase I and quadrature-phase Q digital transmit signals to quadrature analog transmit signals at baseband (IF=0 MHz). The transmitter 516 further includes a pair of low pass filters 576, 578 for low pass filtering the analog RF transmit signals, an IQ up-converter (or modulator) 580 driven by a local oscillator 582 to upconvert and combine the quadrature analog baseband transmit signals to generate the RF transmit signal. The transmitter 516 further includes a variable gain driver 584 to amplify the RF transmit signal, an RF filter 586 to filter the amplified RF transmit signal and a power amplifier (PA) 588 for amplifying the filtered RF transmit signal. The transmitter 516 provides the RF transmit signal to the duplexer 519 to be transmitted on the antenna 520. In one embodiment, the RF filter 586 may be an RF SAW filter. In other embodiments, the RF filter 586 may be implemented using a ceramic filter or a FBAR filter or other suitable filters.

According to one aspect of the present invention, the repeater 500 implements the IQ imbalance compensation method and system of the present invention. The repeater baseband block 514 includes an IQ imbalance compensation metric computation and compensation block 592. One of the above-described IRR-based metric is applied as an indicator of the level of spectral image caused by the repeater's receiver or transmitter IQ imbalance. An adaptive algorithm is applied to minimize the metric and generate compensation values to be applied to the FIR filters 595 in the repeater baseband 514. The FIR filters 595 are used to implement the receive and transmit filters in the repeater baseband 514. In this manner, IQ imbalance compensation is realized.

RF Reference for Interference Cancellation

A repeater employing interference cancellation using the RF transmit signal as the reference signal for channel estimation is described in copending and commonly assigned U.S. patent application Ser. No. 12/686,608, filed Jan. 13, 2010, which application is incorporated herein by reference in its entirety. When the RF transmit signal is used as the reference signal for channel estimation, distortions to the transmit signal due to impairments in the transmitter circuitry of the repeater are accounted for and cancelled out as part of the estimated feedback signal. However, even though distortions associated with the transmit circuitry of the repeater is accounted for, there are still IQ imbalance in the repeater introduced by the reference receiver used to receive the RF transmit signal. According to one aspect of the present invention, the IQ imbalance compensation systems and methods are applied to an interference cancellation repeater employing RF reference to compensate for the IQ imbalance of the reference receiver.

Those skilled in the art will understand that information and signals may be represented using any of a variety of different technologies and techniques. For example: data, information, signals, bits, symbols, chips, instructions, and commands may be referenced throughout the above description. These may be represented by voltages, currents, electromagnetic waves, magnetic fields or particles, optical fields or particles, or any combination thereof.

In one or more exemplary embodiments, the functions and processes described may be implemented in hardware, software, firmware, or any combination thereof. If implemented in software, the functions may be stored on or transmitted over as one or more instructions or code on a computer-readable medium. Computer-readable media includes computer storage media and does not embrace propagating signals. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The term "control logic" used herein applies to software (in which functionality is implemented by instructions stored on a machine-readable medium to be executed using a processor), hardware (in which functionality is implemented using circuitry (such as logic gates), where the circuitry is configured to provide particular output for particular input, and firmware (in which functionality is implemented using re-programmable circuitry), and also applies to combinations of one or more of software, hardware, and firmware.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile station or a repeater, and executed by a processor, for example the microprocessor of modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Moreover, the previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the features shown herein but is to be accorded the widest scope consistent with the principles and novel features disclosed herein.

What is claimed is:

1. A method in an interference cancellation repeater implemented using a zero-IF receiver and a zero-IF transmitter, the method comprising:
    receiving an input signal at a first antenna of the interference cancellation repeater, the input signal being a sum of a remote signal to be repeated and a feedback signal resulting from a feedback channel between the first antenna and a second antenna;
    cancelling a feedback signal estimate from the input signal to generate an echo-cancelled signal;
    delaying the echo-cancelled signal to generate a reference signal;
    generating a numerator value from the echo-cancelled signal;
    generating a denominator value from the input signal or the reference signal or both;
    generating a metric being a ratio of the numerator value to the denominator value, the metric being indicative of an IQ imbalance in the interference cancellation repeater's receiver and/or transmitter; and
    compensating for the IQ imbalance in the interference cancellation repeater's receiver and/or transmitter by applying an adaptive algorithm using the metric.

2. The method of claim 1, wherein the numerator value comprises a conjugate cross-correlation function of the echo-cancelled signal and the reference signal.

3. The method of claim 2, wherein the denominator value comprises a cross-correlation function of the input signal and the reference signal.

4. The method of claim 1, wherein the numerator value comprises a conjugate auto-correlation function of the reference signal.

5. The method of claim 4, wherein the denominator value comprises auto-correlation function of the input signal.

6. The method of claim 1, wherein compensating for the IQ imbalance in the interference cancellation repeater's receiver and/or transmitter by applying an adaptive algorithm using the metric comprises:
    applying a minimum mean square error (MMSE) algorithm using the metric to reduce an amount of spectral image caused by the IQ imbalance of the interference cancellation repeater's transmitter and receiver.

7. The method of claim 1, wherein compensating for the IQ imbalance in the interference cancellation repeater's receiver and/or transmitter by applying an adaptive algorithm using the metric comprises:
    applying a least mean squares (LMS) algorithm using the metric to reduce an amount of spectral image caused by the IQ imbalance of the interference cancellation repeater's transmitter and receiver.

8. The method of claim 1, further comprising:
    generating an in-phase (I) input signal and a quadrature-phase (Q) input signal;
    receiving the I and Q input signals at a interference cancellation repeater baseband processing block before cancelling a feedback signal estimate from the input signal;
    generating an in-phase (I) transmit signal and a quadrature-phase (Q) transmit signal in the interference cancellation repeater baseband processing block after cancelling a feedback signal estimate from the input signal; and
    adjusting filter coefficients in the repeater baseband processing block in response to the adaptive algorithm to compensate for the IQ imbalance in the I and Q input signals and/or the I and Q transmit signals.

9. The method of claim 1, wherein delaying the echo-cancelled signal to generate a reference signal comprises delaying the echo-cancelled signal for a given amount sufficient to decorrelate the echo-cancelled signal from a desired component of the input signal while maximizing the correlation between the reference signal and the feedback signal component of the input signal.

10. The method of claim 1, further comprising:
- receiving at a reference receiver at least a portion of a signal to be transmitted prior to transmission over the second antenna and generating a digitized transmit reference signal;
- using the digitized transmit reference signal as a reference signal for channel estimation; and
- compensating for the IQ imbalance in the interference cancellation repeater's reference receiver by applying an adaptive algorithm using the metric.

11. A method in an interference cancellation repeater implemented using a zero-IF receiver and a zero-IF transmitter, the method comprising:
- receiving an input signal at a first antenna of the interference cancellation repeater, the input signal being a sum of a remote signal to be repeated and a feedback signal resulting from a feedback channel between the first antenna and a second antenna;
- generating a numerator value being a conjugate auto-correlation function of the input signal;
- generating a denominator value being an auto-correlation function of the input signal;
- generating a metric being a ratio of the numerator value to the denominator value, the metric being indicative of an IQ imbalance in the interference cancellation repeater's receiver and/or transmitter; and
- compensating for the IQ imbalance in the interference cancellation repeater's receiver and/or transmitter by applying an adaptive algorithm using the metric.

12. A wireless repeater having a first antenna and a second antenna to receive an input signal and transmit an amplified signal, the input signal being a sum of a remote signal to be repeated and a feedback signal resulting from a feedback channel between the first antenna and the second antenna, the wireless repeater comprising:
- a first receiver circuit being a zero-IF receiver coupled to the first antenna to receive the input signal and to generate digitized input signals at baseband frequency;
- a first transmitter circuit being a zero-IF transmitter coupled to generate the amplified signal to transmit on the second antenna based on digitized transmit signals at baseband frequency; and
- a wireless repeater baseband block configured to receive the digitized input signals from the first receiver circuit and to generate the digitized transmit signals for the first transmitter circuit, the wireless repeater baseband block operative to access a feedback signal estimate, to cancel the feedback signal estimate from the digitized input signals to generate an echo-cancelled signal, and to delay the echo-cancelled signal to generate a reference signal, the wireless repeater baseband block further operative to generate a metric being a ratio of a numerator value derived from the echo-cancelled signal and a denominator value derived from the input signal or the reference signal or both, the metric being indicative of an IQ imbalance in the wireless repeater's receiver and/or transmitter,
- wherein the wireless repeater baseband block is operative to apply an adaptive algorithm using the metric to compensate for the IQ imbalance in the first receiver circuit and/or the first transmitter circuit.

13. The wireless repeater of claim 12, wherein the numerator value comprises a conjugate cross-correlation function of the echo-cancelled signal and the reference signal and the denominator value comprises a cross-correlation function of the input signal and the reference signal.

14. The wireless repeater of claim 12, wherein the numerator value comprises a conjugate auto-correlation function of the reference signal and the denominator value comprises auto-correlation function of the input signal.

15. The wireless repeater of claim 12, wherein the repeater baseband block is configured to apply a minimum mean square error (MMSE) algorithm using the metric to reduce an amount of spectral image caused by the IQ imbalance of the wireless repeater's transmitter and receiver.

16. The wireless repeater of claim 12, wherein the repeater baseband block is configured to apply a least mean squares (LMS) algorithm using the metric to reduce an amount of spectral image caused by the IQ imbalance of the wireless repeater's transmitter and receiver.

17. The wireless repeater of claim 12, wherein the first receiver circuit generates a digitized in-phase (I) input signal and a digitized quadrature-phase (Q) input signal and the wireless repeater baseband block generates a digitized in-phase (I) transmit signal and a digitized quadrature-phase (Q) transmit signal for the first transmitter circuit, the wireless repeater baseband block configured to adjust filter coefficients in response to the adaptive algorithm to compensate for the IQ imbalance in the I and Q input signals and/or the I and Q transmit signals.

18. The wireless repeater of claim 12, wherein the repeater baseband block is configured to delay the echo-cancelled signal for a given amount sufficient to decorrelate the echo-cancelled signal from a desired component of the input signal while maximizing the correlation between the reference signal and the feedback signal component of the input signal.

19. The wireless repeater of claim 12, further comprising:
- a second receiver circuit being a zero-IF receiver coupled to receive at least a portion of a signal to be transmitted prior to transmission over the second antenna and to generate a digitized transmit reference signal,
- wherein the wireless repeater baseband block is configured to receive the digitized transmit reference signal as a reference signal for channel estimation and is further configured to compensate for the IQ imbalance in the second receiver circuit by applying an adaptive algorithm using the metric.

20. A wireless repeater having a first antenna and a second antenna to receive an input signal and transmit an amplified signal, the input signal being a sum of a remote signal to be repeated and a feedback signal resulting from a feedback channel between the first antenna and the second antenna, the wireless repeater comprising:
- a first receiver circuit being a zero-IF receiver coupled to the first antenna to receive the input signal and to generate digitized input signals at baseband frequency;
- a first transmitter circuit being a zero-IF transmitter coupled to generate the amplified signal to transmit on the second antenna based on digitized transmit signals at baseband frequency; and
- a wireless repeater baseband block configured to receive the digitized input signals from the first receiver circuit and to generate the digitized transmit signals for the first transmitter circuit, the wireless repeater baseband block operative to generate a metric being a ratio of a numerator value being a conjugate auto-correlation function of the input signal and a denominator value being an auto-correlation function of the input signal, the metric being indicative of an IQ imbalance in the wireless repeater's receiver and/or transmitter,
- wherein the wireless repeater baseband block is operative to apply an adaptive algorithm using the metric to compensate for the IQ imbalance in the first receiver circuit and/or the first transmitter circuit.

21. A wireless repeater having a first antenna and a second antenna to receive an input signal and transmit an amplified signal, the input signal being a sum of a remote signal to be repeated and a feedback signal resulting from a feedback channel between the first antenna and the second antenna, the wireless repeater comprising:

first means for receiving the input signal from the first antenna and for generating digitized input signals at baseband frequency using direct conversion;

means for generating the amplified signal to transmit on the second antenna based on digitized transmit signals at baseband frequency using direct conversion;

means for receiving the digitized input signals from the first means and generating the digitized transmit signals, the means including a means for accessing a feedback signal estimate, canceling the feedback signal estimate from the digitized input signals to generate an echo-cancelled signal, and delaying the echo-cancelled signal to generate a reference signal, the means further for generating a metric being a ratio of a numerator value derived from the echo-cancelled signal and a denominator value derived from the input signal or the reference signal or both, the metric being indicative of an IQ imbalance in the wireless repeater's receiver and/or transmitter, the means further for applying an adaptive algorithm using the metric to compensate for the IQ imbalance in the first receiver circuit and/or the first transmitter circuit.

22. A non-transitory computer readable medium having stored thereon computer executable instructions for performing at least the following acts:

receiving an input signal at a first antenna of a repeater, the input signal being a sum of a remote signal to be repeated and a feedback signal resulting from a feedback channel between the first antenna and a second antenna;

cancelling a feedback signal estimate from the input signal to generate an echo-cancelled signal;

delaying the echo-cancelled signal to generate a reference signal;

generating a numerator value from the echo-cancelled signal;

generating a denominator value from the input signal or the reference signal or both;

generating a metric being a ratio of the numerator value to the denominator value, the metric being indicative of an IQ imbalance in the repeater's receiver and/or transmitter; and     compensating for the IQ imbalance in the repeater's receiver and/or transmitter by applying an adaptive algorithm using the metric.

\* \* \* \* \*